US009621782B2

United States Patent
Inoue et al.

(10) Patent No.: US 9,621,782 B2
(45) Date of Patent: Apr. 11, 2017

(54) IMAGE CAPTURING APPARATUS AND METHOD FOR CALCULATING SENSITIVITY RATIO OF PHASE DIFFERENCE PIXEL

(71) Applicant: FUJIFILM Corporation, Tokyo (JP)

(72) Inventors: Kazuki Inoue, Saitama (JP); Takashi Aoki, Saitama (JP)

(73) Assignee: FUJIFILM Corporation, Tokyo (JP)

(*) Notice: Subject to any disclaimer, the term of this patent is extended or adjusted under 35 U.S.C. 154(b) by 134 days.

(21) Appl. No.: 14/229,278

(22) Filed: Mar. 28, 2014

(65) Prior Publication Data
US 2014/0211076 A1  Jul. 31, 2014

Related U.S. Application Data

(63) Continuation of application No. PCT/JP2012/072480, filed on Sep. 4, 2012.

(30) Foreign Application Priority Data

Sep. 30, 2011 (JP) ................. 2011-218533

(51) Int. Cl.
*H04N 5/232* (2006.01)
*G02B 7/34* (2006.01)
(Continued)

(52) U.S. Cl.
CPC ........... *H04N 5/23212* (2013.01); *G02B 7/34* (2013.01); *H04N 5/3696* (2013.01); *H04N 9/07* (2013.01)

(58) Field of Classification Search
CPC .. H04N 5/23212; H04N 5/367; H04N 5/3675; H04N 5/2176; H04N 9/045; H04N 5/217; G02B 7/34
(Continued)

(56) References Cited

U.S. PATENT DOCUMENTS

2011/0109775 A1* 5/2011 Amano .................. 348/241
2011/0164169 A1   7/2011 Yamasaki

FOREIGN PATENT DOCUMENTS

JP   2008-275712 A   11/2008
JP   2009-75407 A    4/2009
(Continued)

OTHER PUBLICATIONS

International Search Report, issued in PCT/JP2012/072480, dated Dec. 18, 2012.
(Continued)

*Primary Examiner* — Joel Fosselman
*Assistant Examiner* — Fayez Bhuiyan
(74) *Attorney, Agent, or Firm* — Birch, Stewart, Kolasch & Birch, LLP

(57) ABSTRACT

An image capturing apparatus includes: an image capturing element in which a plurality of pixels are formed and arranged and phase difference pixels are formed within an effective pixel region; a photographing lens; and a control unit which analyzes a captured image signal by the image capturing element, obtains a phase difference amount from detection signals of two of the phase difference pixels that make a pair, and performs a focusing control of the photographing lens, in which the control unit calculates, as a sensitivity ratio, a ratio of an integration value of light receiving sensitivity of the phase difference pixel within a range of an incident angle of the photographing lens, and an integration value of light receiving sensitivity of a pixel other than the phase difference pixel, and corrects a deviation in light receiving sensitivity between the two phase difference pixels.

8 Claims, 13 Drawing Sheets

(51) Int. Cl.
*H04N 5/369* (2011.01)
*H04N 9/07* (2006.01)

(58) Field of Classification Search
USPC .......................................... 349/349
See application file for complete search history.

(56) References Cited

FOREIGN PATENT DOCUMENTS

| | | |
|---|---|---|
| JP | 2010-107771 A | 5/2010 |
| JP | 2011-2848 A | 1/2011 |
| JP | 2011-176714 A | 9/2011 |
| WO | WO 2010/050403 A1 | 5/2010 |

OTHER PUBLICATIONS

Written Opinion of the International Search Authority, issued in PCT/JP2012/072480, dated Dec. 18, 2012.
Extended European Search Report dated May 21, 2015, for European Application No. 12837562.3.

\* cited by examiner

IMAGE CAPTURING APPARATUS AND METHOD FOR CALCULATING SENSITIVITY RATIO OF PHASE DIFFERENCE PIXEL

CROSS REFERENCE TO RELATED APPLICATIONS

This is a continuation of International Application No. PCT/JP2012/072480 filed on Sep. 4, 2012, and claims priority from Japanese Patent Application No. 2011-218533, filed on Sep. 30, 2011, the entire disclosures of which are incorporated herein by reference.

TECHNICAL FIELD

The present invention relates to an image capturing apparatus including an image capturing element with a phase difference pixel and a method for calculating a sensitivity ratio of the phase difference pixel.

BACKGROUND ART

Some pixels of a plurality of pixels formed and arranged in a light receiving region in a two-dimensional array pattern are formed by a phase difference pixel (also referred to as a focus detecting pixel) in an image sensor installed in an image capturing apparatus (camera). In the image capturing apparatus installed with the image capturing element, a phase difference AF method is adopted as an AF method that adjusts a focus position of a photographing lens to a photographic subject.

The phase difference pixel has a structure in which the phase difference pixel is pupil-divided into one pixel and the other pixel of a pair of pixels, one pixel receives one beam of two beams through different light paths of the photographing lens, and the other pixel receives the other beam to detect a relative positional deviation of a pupil dividing direction, as disclosed in, for example, Patent Literature 1. In addition, controlling an out-of-focus amount of the photographing lens depending on the positional deviation amount is the phase difference AF method.

FIG. 13 is a surface schematic diagram of one example of a solid-state image capturing element having a phase difference pixel pair which is pupil-divided. A normal pixel installed with a wide light blocking layer opening 6 (only one portion is illustrated and the other portions are omitted) and a phase difference pixel (represented by reference numeral 7) installed with light blocking layer openings 7a and 7b, which are narrower than the light blocking layer opening 6, are provided in a plurality of pixels 5 which are formed and arranged on the surface of the a semiconductor substrate in a two-dimensional array pattern. The light blocking opening 7a is installed to be eccentric to a right side of a pixel center and the light blocking layer opening 7b is installed to be eccentric to a left side of the pixel center.

Meanwhile, the image capturing apparatus installed with the image capturing element includes a lens replacement type image capturing apparatus in addition to an image capturing apparatus to which one type of photographing lens is fixed and used. When the photographing lens is replaced, a maximum aperture, a focus distance, a spherical aberration, and the like of the photographing lens are changed.

In the image capturing apparatus installed with the image capturing element including the phase difference pixel as described above, when the image capturing apparatus is the lens replacement type image capturing apparatus, since a physical condition such as a placement position of the phase difference pixel on the image capturing element or an interval between the pair of pixels cannot be changed, if the photographing lens is replaced, a focusing precision of the photographing lens is influenced.

Therefore, in the related art, as disclosed in, for example, Patent Literature 1 below, a correction amount is prepared as table data and when the photographing lens is replaced, appropriate table data is selected.

CITATION LIST

Patent Literature

Patent Literature 1: JP-A-2010-107771

SUMMARY OF INVENTION

Technical Problem

In the image capturing apparatus with the image capturing element including the phase difference pixel as described above, when an incident angle range for each F number and each image height is changed in a case of a lens replacement, or the like, an incident angle of incident light is changed depending on an image plane position of the phase difference pixel and an incident light amount is also changed, and as a result, an output value as the phase difference pixel, that is, sensitivity is changed and a detected phase difference amount is changed. Therefore, focusing precision of a photographing lens is influenced.

An object of the present invention is to provide an image capturing apparatus capable of performing phase difference AF processing with high precision by appropriately correcting sensitivity of a phase difference pixel depending on a change of an incident angle of incident light and a method for calculating a sensitivity ratio of a phase difference pixel.

Solution to Problem

An image capturing apparatus and a method for calculating a sensitivity ratio of a phase difference pixel of the present invention are characterized by the image capturing apparatus comprising: an image capturing element in which a plurality of pixels is formed and arranged in a two-dimensional array pattern and phase difference pixels are formed in a focus detection region within an effective pixel region; a photographing lens which is installed in a stage preceding the image capturing element; and a control unit which analyzes a captured image signal by the image capturing element, obtains a phase difference amount from detection signals of two of the phase difference pixels that make a pair, and performs a focusing control of the photographing lens, in which the control unit calculates, as a sensitivity ratio, a ratio of an integration value of light receiving sensitivity of the phase difference pixel within a range of an incident angle of the photographing lens, and an integration value of light receiving sensitivity within the range of a pixel other than the phase difference pixel, and corrects a deviation in light receiving sensitivity between the two phase difference pixels that make the pair with the sensitivity ratio to correct the detection signals for acquiring the phase difference amount.

Advantageous Effects of Invention

According to the present invention, although a sensitivity deviation occurs between a pair of phase difference pixels, the sensitivity deviation can be appropriately corrected to thereby perform in phase difference AF processing with high precision.

DESCRIPTION OF EMBODIMENTS

Hereinafter, an embodiment of the present invention will be described with reference to the accompanying drawings.

Figure 1:
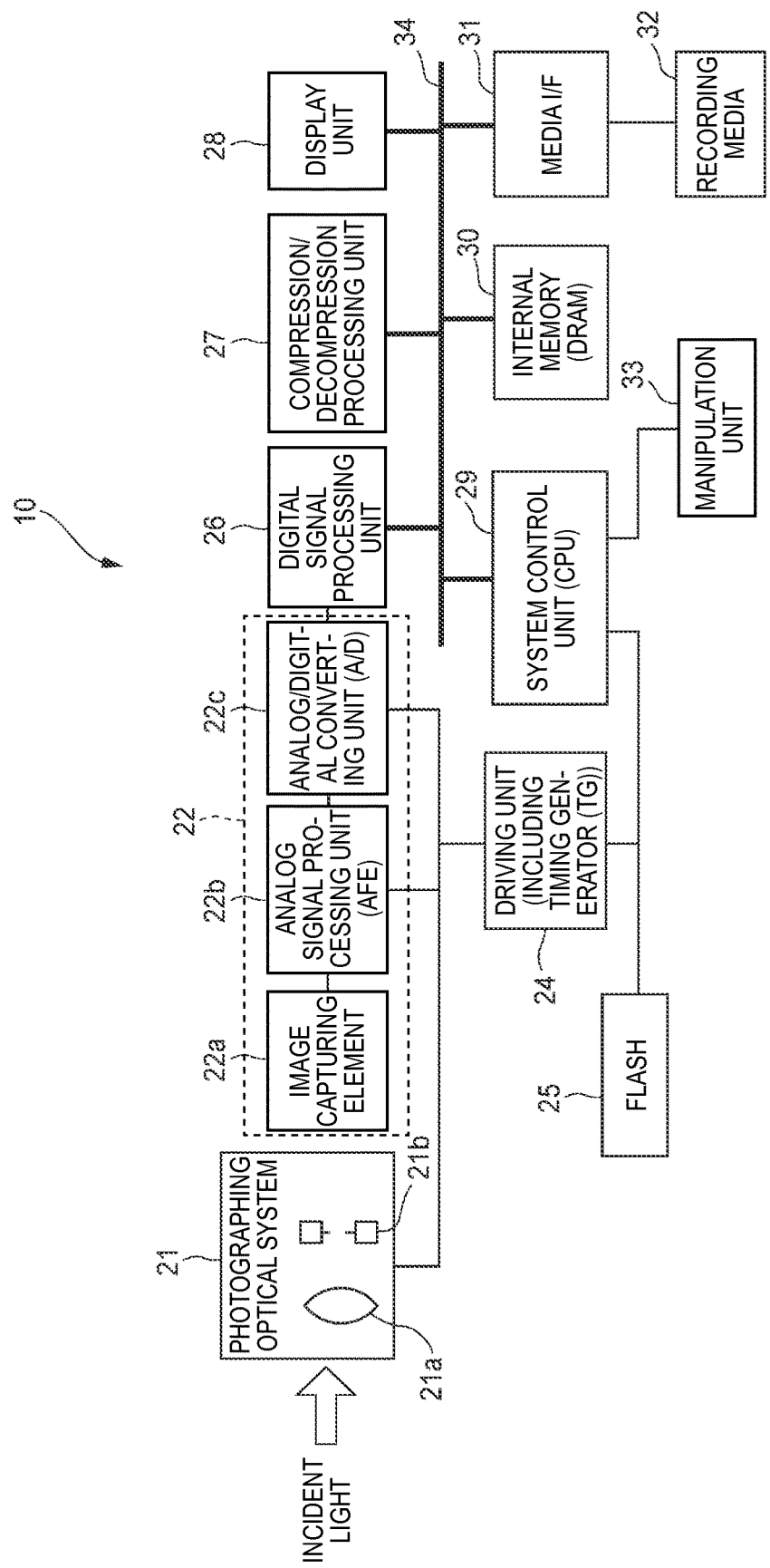
FIG. 1 is a functional block diagram of an image capturing apparatus according to an embodiment of the present invention.

FIG. 1 is a functional block configuration diagram of a digital camera (image capturing apparatus) according to an embodiment of the present invention. A digital camera 10 includes a photographing optical system 21 including a photographing lens 21a or a diaphragm 21b and an image capturing element chip 22 disposed in a stage following the photographing optical system 21. The photographing optical system 21 is replaceably installed and a user may select a desired photographing optical system (a wide-angle lens system, a telephoto lens system, and the like).

The image capturing element chip 22 includes a single-plate type solid-state image capturing element 22a which picks up a color image such as a CCD type or a CMOS type as signal reading means, an analog signal processing unit (AFE) 22b which performs analog processing such as automatic gain control (AGC) or correlation dual sampling processing of analog image data output from the solid-state image capturing element 22a, and an analog/digital converting unit (A/D) 22c which converts the analog image data output from the analog signal processing unit 22b into digital image data.

The digital camera 10 further includes a driving unit (including a timing generator (TG)) 23 which performs a focus position control or a zoom position control of the photographing optical system 21 or controls driving of the solid-state image capturing element 22a, the analog signal processing unit 22b, and the A/D 22c by an instruction from a system control unit (CPU) 29 to be described below, and a flash 25 which emits light by the instruction from the CPU 29. The driving unit 23 may be mounted in the image capturing element chip 22 together.

The digital camera 10 of the embodiment further includes a digital signal processing unit 26 which performs known image processing such as acquisition or interpolation processing or white balance correction, RGB/YC conversion processing, on the digital image data output from the A/D 22c, a compression/extension processing unit 27 which compresses image data into image data such as a JPEG format, whereas extends the image data, a display unit 28 which displays a menu, and the like or a through image or a captured image, the system control unit (CPU) 29 which integrally controls the entire digital camera, an internal memory 30 such as a frame memory, or the like, a media interface (I/F) unit 31 which performs interface-processing with a recording media 32 that stores JPEG image data, and the like, and a bus 34 which connects he digital signal processing unit 26, compression/extension processing unit 27, the display unit 28, the system control unit (CPU) 29, the internal memory 30, and the media interface (I/F) unit 31 to each other, and a manipulation unit 33, which inputs an instruction from a user, is connected to the system control unit 29.

The system control unit 29 performs the focus position control (focusing control) of the photographing optical system 21 by acquiring the phase difference amount from the detection signal of the phase difference pixel or calculating the sensitivity ratio to be described below, by using the digital signal processing unit 26, and the like thereunder.

Figure 2:
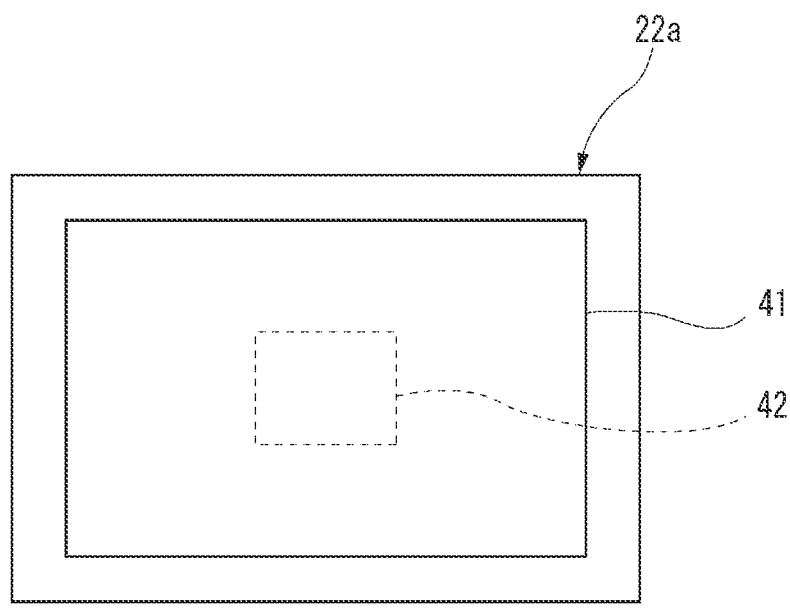
FIG. 2 is an explanatory diagram of a solid-state image capturing element illustrated in FIG. 1.

FIG. 2 is a surface schematic diagram of the solid-state image capturing element 22a.

The solid-state image capturing element 22a is formed on a rectangular semiconductor substrate which is long in width and a plurality of pixels (a photoelectric conversion element: a photodiode) is formed in a light receiving region (effective pixel region) 41 in a two-dimensional array pattern. In an illustrated example of the light receiving region 41, a center region of the light receiving region 41 is configured as a focus detection region 42 and a phase difference pixel to be described below is provided in the focus detection region 42.

Figure 3:
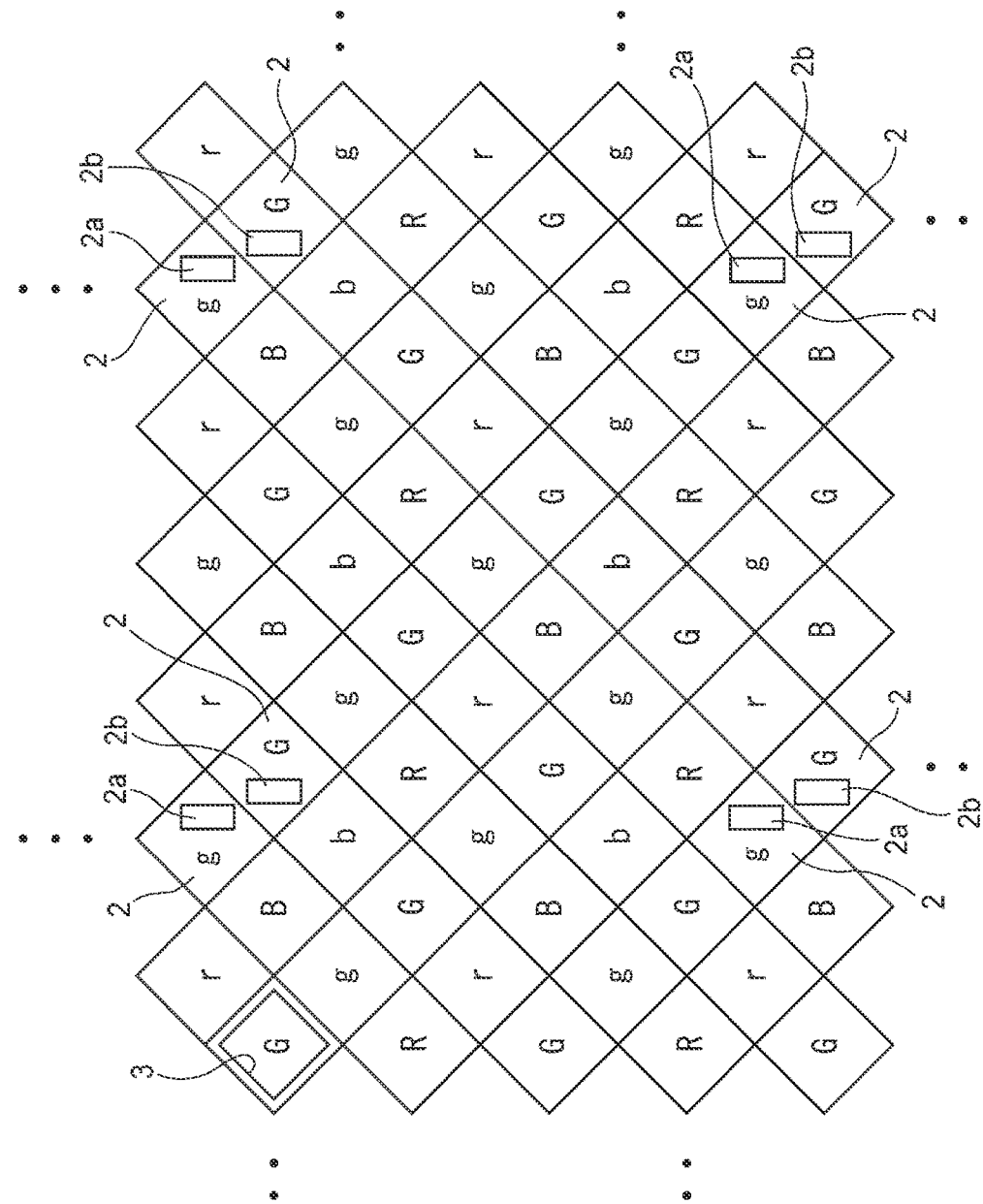
FIG. 3 is a partially enlarged diagram of a focus detection region of the solid-state image capturing element illustrated in FIG. 2.

FIG. 3 is an enlarged diagram of a partial region of the focus detection region 42 illustrated in FIG. 2 and illustrates a pixel array and a color filter array. In the illustrated embodiment, a so-called honeycomb pixel array is provided, in which an odd-numbered (alternatively, even-numbered) pixel row (a square frame which is tilted at 45□ represents each pixel and R (red), G (green), and B (blue) on each pixel represent colors of color filters) is disposed to be shifted from an even-numbered (or odd-numbered) pixel row by ½ pixel pitch.

In addition, in the case of only each pixel of the even-numbered row, the pixel array becomes a square lattice array and three primary color filters RGB are bayer-arrayed therein. In addition, in the case of only each pixel of the odd-numbered row, the pixel array becomes the square lattice array and three primary color filters rgb are bayer-arrayed therein. R=r, G=g, and B=b, and the same-color pixels that are slantly adjacent to each other form pair pixels. Light receiving areas of the respective pixels are the same as each other and the sizes of light blocking layer openings are also the same as each other (the sizes of the light blocking layer openings of only phase difference pixels to be described below are different from each other). Further, microlenses having the same shape in all pixels are mounted on the respective color filters (the microlenses are not illustrated).

In a pixel row of pixels (hereinafter, referred to as a G pixel, similarly for R, B, r, g, and b) in which G filters of the solid-state image capturing element 22a illustrated in FIG. 3 are stacked, and a pixel row of g pixels adjacent thereto, one pixel of four pixels is set as the pair of a phase difference pixel 2. In the phase difference pixel (the pair of the G pixel and the g pixel) 2, a light blocking film opening 2a is installed to be smaller than a light blocking layer opening 3 (only one portion is illustrated and the other portions are omitted) of another normal pixel and to be eccentric to a right side with respect to a pixel center of a G pixel 2, and a light blocking layer opening 2b is installed to be the same as the light blocking film opening 2a and to be eccentric to a left side with respect to a pixel center of a g pixel 2, thereby achieving pupil division.

Figure 13:
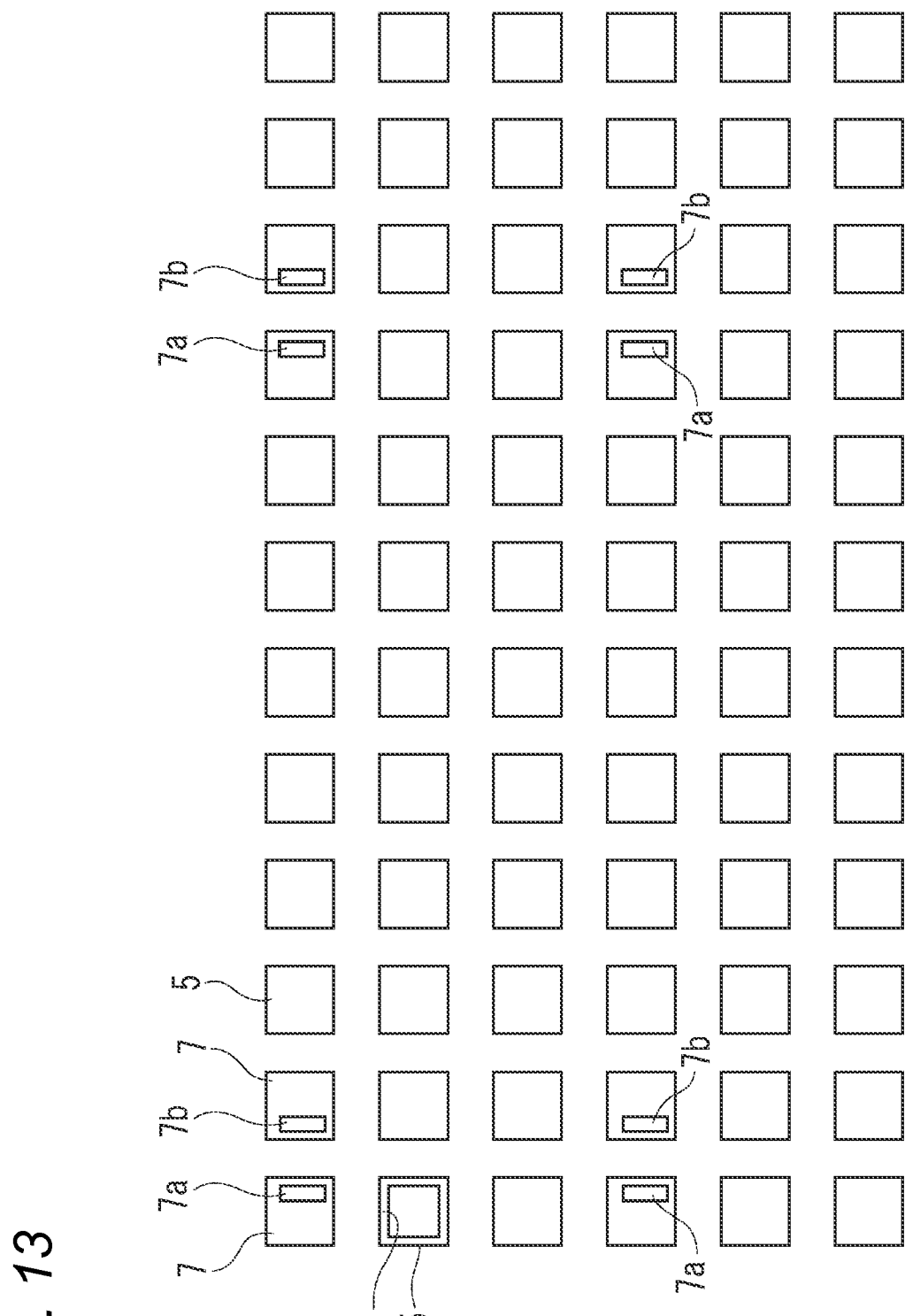
FIG. 13 is a diagram illustrating one example of a phase difference pixel.

Further, in an example of FIG. 3, the pixel array is the so-called honeycomb pixel array, but the embodiment below may be applied even in the image capturing element in which the pixel array is the square lattice array illustrated in FIG. 13. Since a pair of phase difference pixels are preferably pixels having the same color, the color filter array in which two pixels having the same color are arranged may be used.

Figure 4:
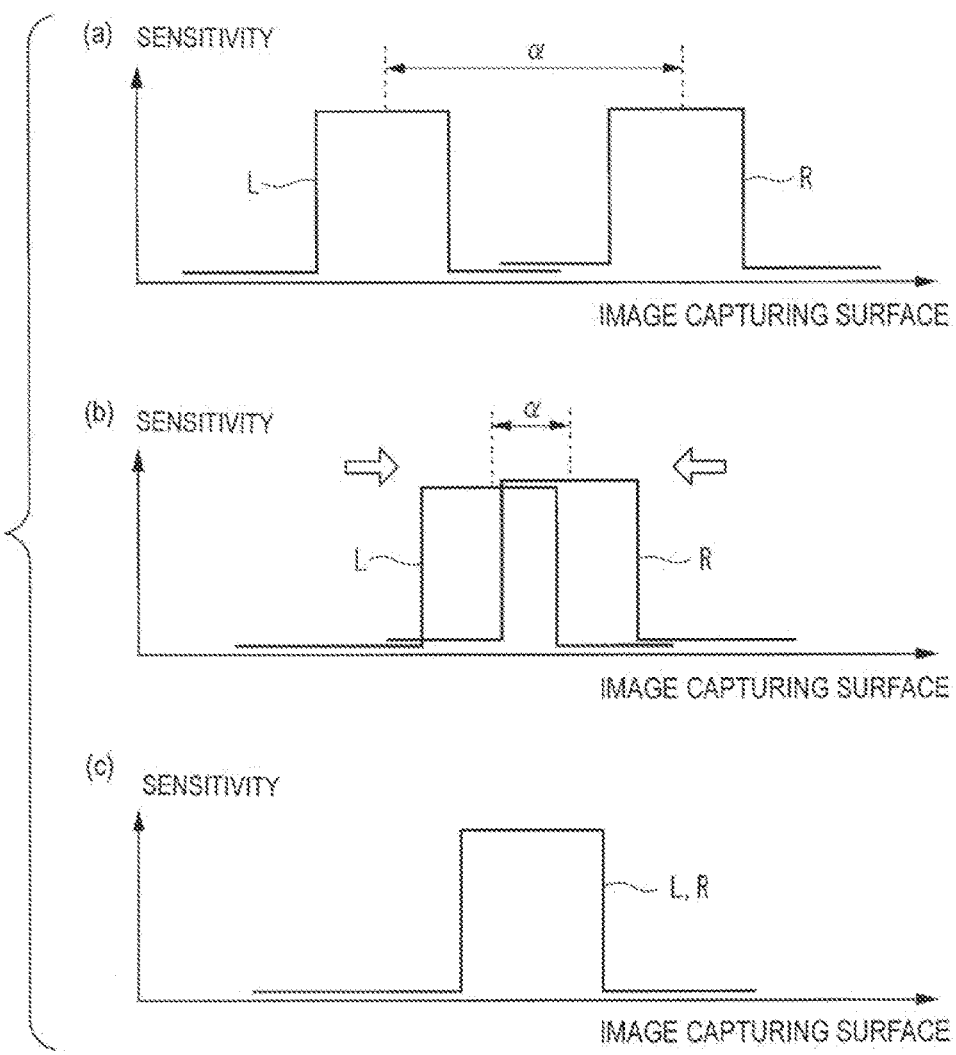
FIG. 4 is an explanatory diagram of a phase difference by a phase difference pixel.

FIG. 4 is an explanatory diagram of phase difference detection by a pair of phase difference pixels (one pixel and the other pixel will be referred to as a first pixel and a second pixel, respectively). (a) of FIG. 4 is a graph illustrating a relationship between a light receiving sensitivity distribution L of the first pixel and a light receiving sensitivity distribution R of the second pixel and a coordinate position of an imaging surface when a photographic subject exists at a position which significantly deviates from a focusing position. The respective light receiving sensitivity distributions L and R have a mountain shape (illustrated as a rectangular wave in FIG. 4) and an interval a therebetween is opened. The a corresponds to the phase difference amount.

(b) of FIG. 4 is a graph illustrating the light receiving sensitivity distributions L and R of the first pixel and the second pixel when the photographic subject exists closer to the focusing position than that of (a) of FIG. 4. As compared with (a) of FIG. 4, the light receiving sensitivity distributions L and R are close to each other. That is, the interval a between the respective light receiving sensitivity distributions L and R is smaller than that of (a) of FIG. 4.

(c) of FIG. 4 is a graph illustrating the light receiving sensitivity distributions L and R of the first pixel and the second pixel when the photographic subject exists at the focusing position. When the photographic subject exists at the focusing position, a phase difference does not exist between detection signals of the first pixel and the second pixel and both the output distributions L and R overlap each other.

By acquiring the aforementioned interval (phase difference amount) a, it may be known whether the photographic subject is focused how a focus position of the photographing lens is shifted. However, when the phase difference amount is acquired, the phase difference amount may not be precisely detected without considering the F number and the image height of the photographing lens.

Figure 5:
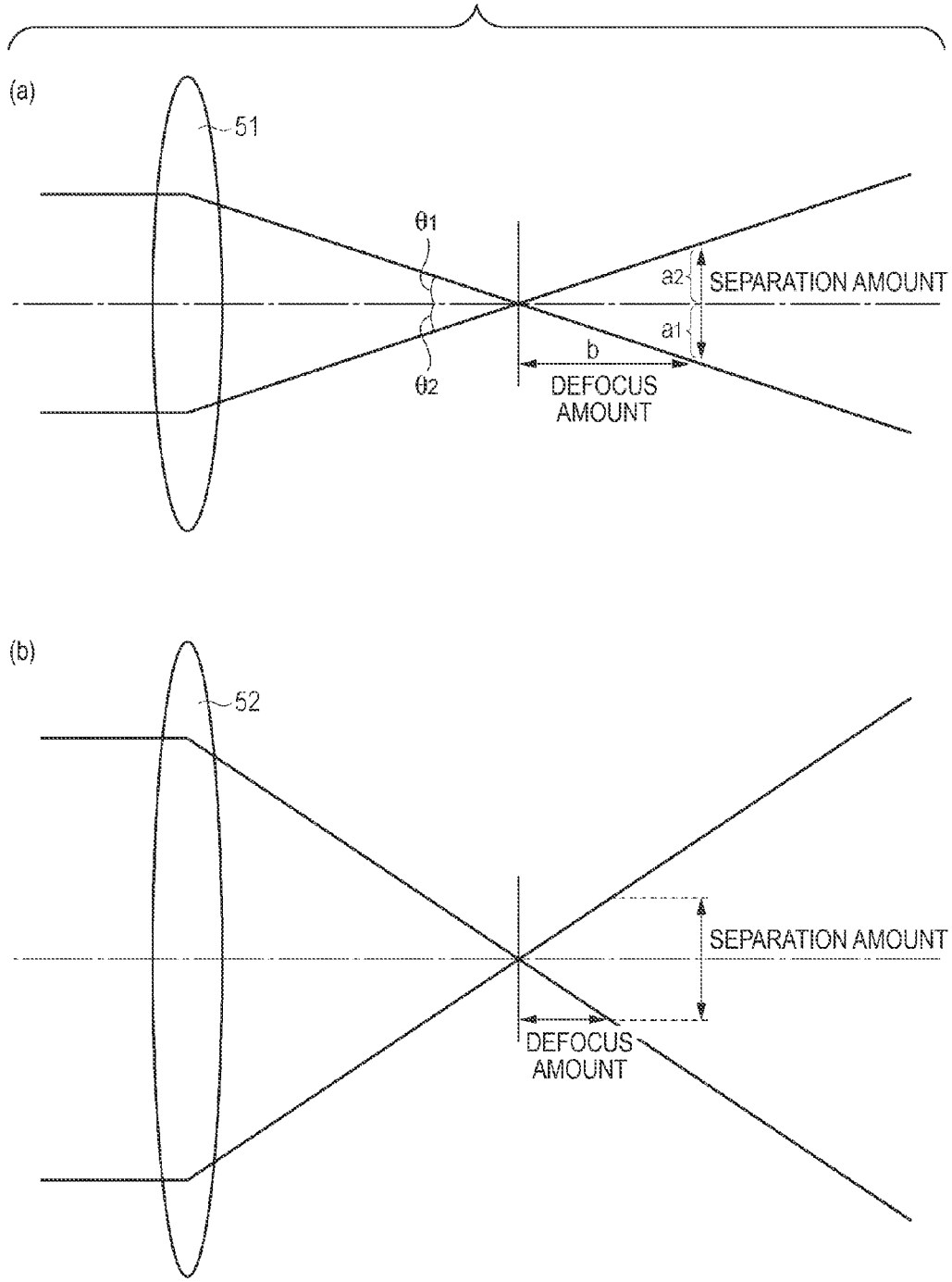
FIG. 5 is a diagram describing the relationship between a phase difference amount (separation amount) and a defocus amount (a) before replacing a photographing lens having a different F number and (b) after replacing the photographing lens having the different F number.

FIG. 5 is a diagram illustrating a relationship between a phase difference amount (=separation amount) of the first pixel and the second pixel and a defocus amount. The defocus amount is a distance between an image forming position (separation amount=0) and the imaging surface when an image is not formed on the imaging surface, that is, an out-of-focus amount.

When the photographing lens 51 illustrated in (a) of FIG. 5 is replaced with a photographing lens 52 having a different F number as illustrated in (b) of FIG. 5, the incident angle of the incident light is changed depending on the F number and the image height and as can be seen by comparing (a) and (b) of FIG. 5, the defocus amount is changed in spite of the same separation amount (phase difference amount).

Incident angles $\theta_1$ and $\theta_2$ of incident light, respective separation amounts $a_1$ and $a_2$ (a total separation amount is $a_1+a_2$), and a defocus amount b have a predetermined functional relationship, $\tan\theta_1 = a_1/b$, that is, $\theta_1 = \tan^{-1} a_1/b$ $\tan\theta_2 = a_2/b$, that is, $\theta_2 = \tan^{-1} a_2/b$.

As a result, when the phase difference amounts (separation amount=$a_1+a_2$) of the first pixel and the second pixel, and $\theta_1$ and $\theta_2$ may be known, the defocus amount b may be acquired. A method for calculating $\theta_1$ and $\theta_2$ is not limited in the present invention, but for example, a sensitivity weight center position of the light receiving sensitivity distribution characteristic R is calculated based on Equation 1 below as well as a sensitivity weight center (luminance weight center) position of the light receiving sensitivity distribution characteristic L is calculated, within an incident angle range X corresponding to the F number of the photographing lens in photographing.

$$\theta_G = \frac{\sum(\theta \times I_{(\theta)})}{\sum \theta} \therefore \text{range of } F \text{ number} \qquad \text{[Equation 1]}$$

Within the incident angle range X corresponding to the F number, a multiplication value of the incident angle $\theta$ and light receiving sensitivity $I(\theta)$ is integrated as a value of $\theta$ and the integration value is divided by an integration value of $\theta$ to obtain a sensitivity weight center $\theta_G$. An incident angle corresponding to a position of a sensitivity weight center OG of the light receiving sensitivity distribution L becomes a focusing parameter value $\theta_1$ and an incident angle corresponding to a sensitivity weight center position OG of the light receiving sensitivity distribution R becomes a focusing parameter value $\theta_2$.

Further, when the incident angle range for each F number and each image height is changed as in replacing the lens, apart from the above, the incident light amount is changed for each image plane position of the phase difference pixel and an output value as the phase difference pixel, that is, the sensitivity is changed, and as a result, the detected phase difference amount is changed. Therefore, in an embodiment that will be described hereinafter, a 'sensitivity ratio' is calculated and a correction for canceling an influence of the incident angle of light to the phase difference pixel on a change of the light amount is performed with respect to a detection signal of the phase difference pixel by using the sensitivity ratio, thereby performing a high-precision focusing control in spite of replacing the lens, and the like.

Figure 6:
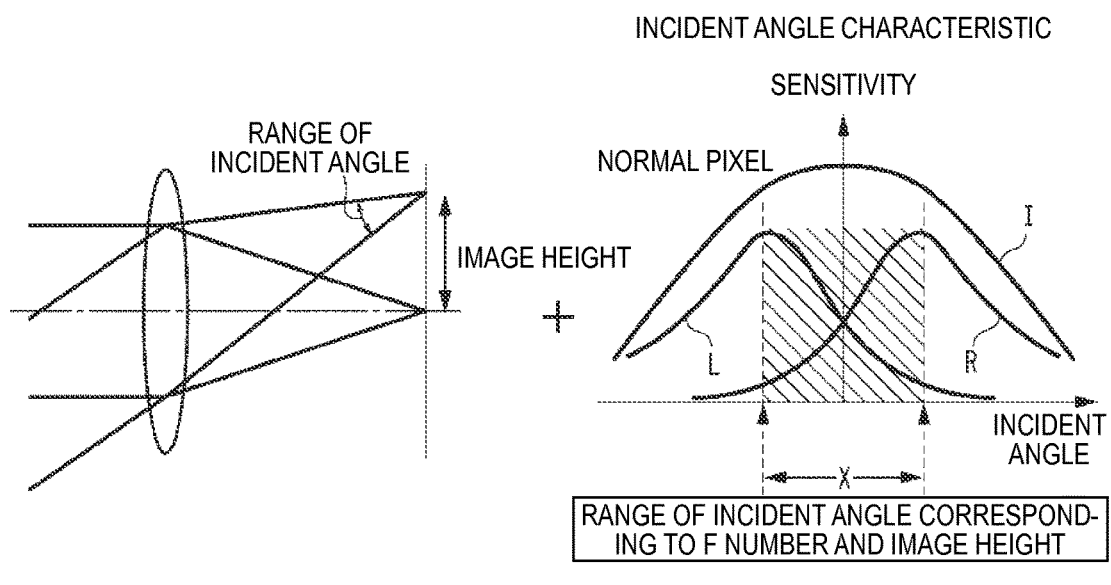
FIG. 6 is an explanatory diagram of a method for calculating a sensitivity ratio according to a first embodiment of the present invention.
Figure 6:
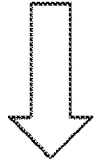
Figure 6:
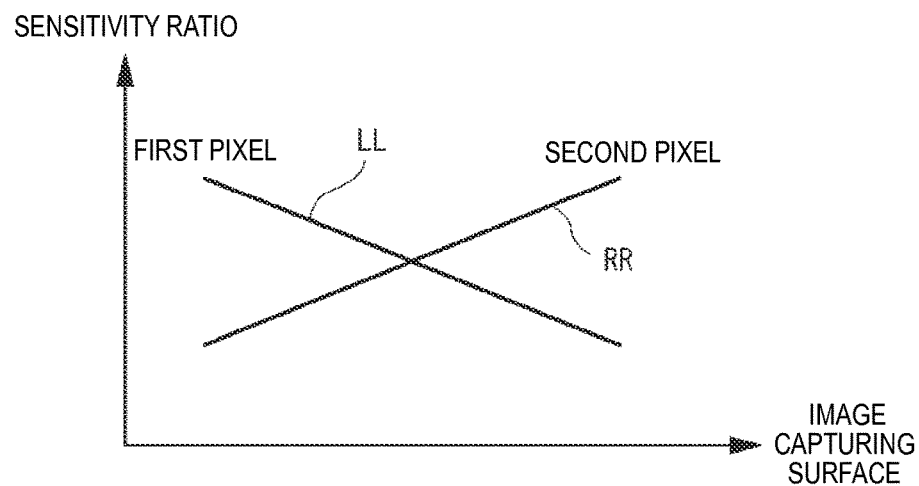

FIG. 6 is an explanatory diagram of a method for calculating a sensitivity ratio. The sensitivity ratio refers to a ratio of an integration value of light receiving sensitivity I of the normal pixel and the integration value of light receiving sensitivity L of the first pixel or an average value of ratio of the light receiving sensitivity I and the light receiving sensitivity L. The same applies with the second pixel. Further, the sensitivity ratio may be represented as a ratio of the output value of the normal pixel and the output value of the phase difference pixel or an average value of the ratio of the output values.

As illustrated at an upper right side of FIG. 6, respective peak positions of the light receiving sensitivity distribution L of the first pixel and the light receiving sensitivity distribution R of the second pixel horizontally deviate from each other, and are substantially symmetric to each other around an incident angle of 0, but may be asymmetric to each other due to a variation in manufacturing of a film that forms the light blocking layer openings 2a and 2b.

In this regard, the light receiving sensitivity distribution I of the normal pixel has a mountain-shaped characteristic in which the sensitivity is at the peak at the incident angle of 0 because the light blocking layer opening 3 is not eccentric with respect to the pixel center. Further, since an area of the light blocking layer opening 3>an area of the light blocking layer opening 2a(2b), the light receiving sensitivity I>L(R).

Herein, the sensitivity ratio of the light receiving sensitivity distributions L and R of the phase difference pixel and the light receiving sensitivity distribution I is calculated and in this case, as illustrated at the upper right side of FIG. 6, the sensitivity ratio is calculated only within the range X of the incident angle (ray angle) of the incident light corresponding to the F number and the image height of the photographing lens.

Figure 7:
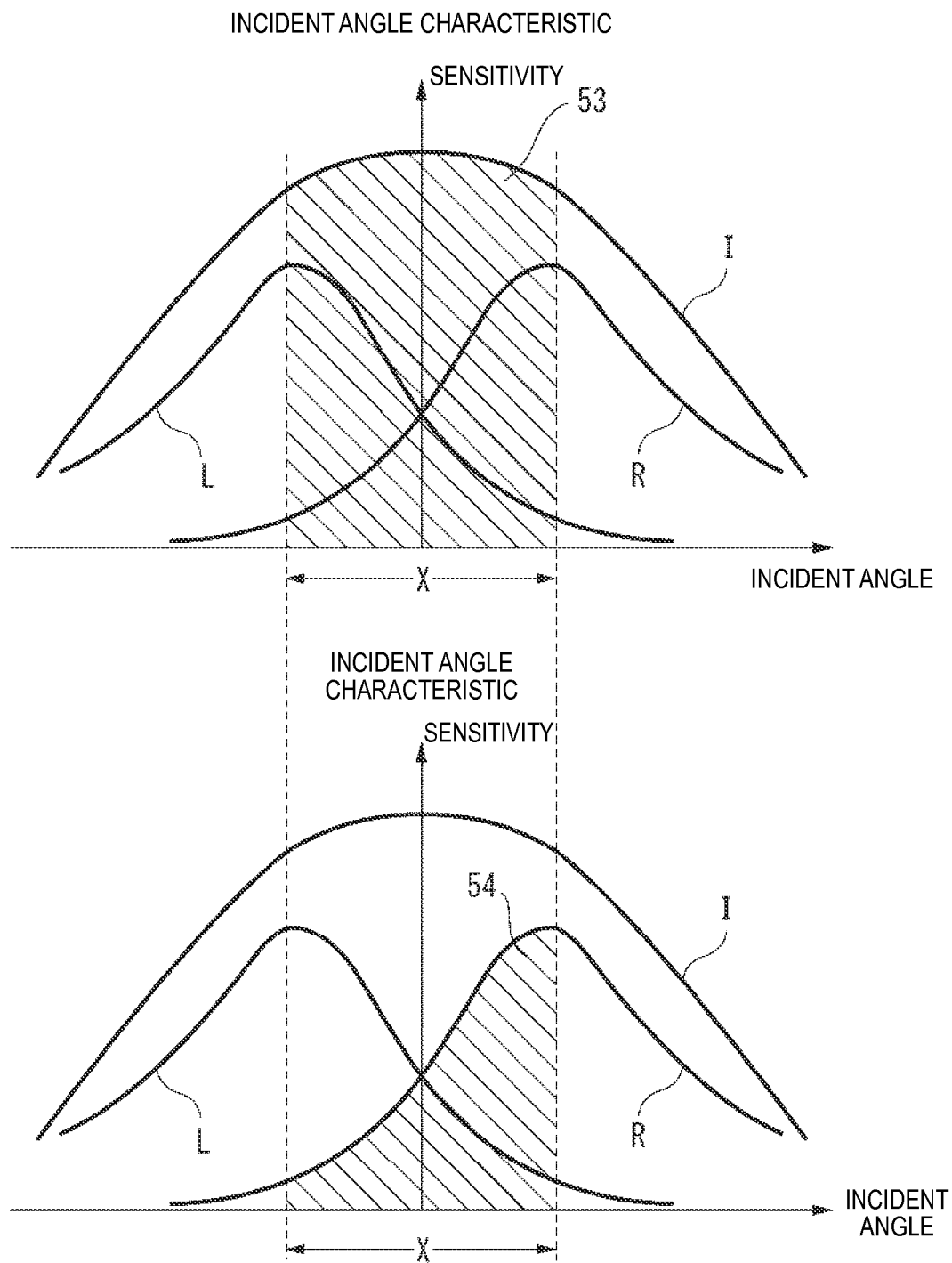
FIG. 7 is an explanatory diagram of the method for calculating a sensitivity ratio which complementarily describes FIG. 6.

FIG. 7 is an explanatory diagram of a method for calculating a sensitivity ratio. An integration value (equivalent to an area of a slant line region 53) within the range X of the light receiving sensitivity distribution characteristic I of the normal pixel is acquired and an integration value (equivalent to an area of a slant line region 54) within the range X of the light receiving sensitivity distribution characteristic R of the phase difference pixel (second pixel) is acquired. The integration value within the sensitivity distribution characteristic L of the first pixel is also acquired.

In addition, a ratio of the integration value equivalent to the area of the slant line region 53 in the normal pixel and the integration value of the first pixel of the phase difference pixel is acquired to acquire the sensitivity ratio. The sensitivity ratio is calculated for each of phase difference pixels that are arranged in a horizontal direction on a light receiving plane of the image capturing element, and a plotted graph becomes a sensitivity ratio characteristic line LL of the first pixel illustrated at a lower side of FIG. 6. Similarly, a sensitivity ratio characteristic line RR of the second pixel of the phase difference pixel is calculated.

By acquiring the sensitivity ratio characteristic lines LL and RR, a detection signal of a phase difference pixel of which the sensitivity is erroneous may be corrected with the sensitivity ratio without being influenced by the F number and the image height of the photographing lens when a light receiving sensitivity deviation occurs between the first pixel and the second pixel.

As such, in the embodiment, since a range of calculating the sensitivity ratio is limited with the F number of the photographing lens, the sensitivity ratio may be precisely calculated even though the photographing lens is replaced.

Further, although an optical characteristic of the photographing lens varies and the range X corresponding to the F number varies by the photographing lens, since a sensitivity ratio is calculated within the range X, it is possible to obtain the sensitivity ratio which is not influenced by the variation of the optical characteristic of the photographing lens.

In addition, although entity fluctuation exists in a structure of the phase difference pixel of the image capturing element, the sensitivity ratio is calculated based on the light receiving sensitivity distribution characteristics L and R of the phase difference pixel, thereby calculating a sensitivity ratio which is not influenced by entity fluctuation of the image capturing element.

Moreover, in the aforementioned embodiment, since the sensitivity ratio is calculated within the range X depending on the F number and the image height of the photographing lens, the incident angles $\theta 1$ and $\theta 2$ are calculated from the sensitivity weight center position according to the calculated sensitivity ratio at the time of calculating the incident angles $\theta 1$ and $\theta 2$ within the range X, but the present invention is not limited thereto. For example, incident angles may be calculated at sensitivity centers such as area center positions of the light receiving sensitivity distributions L and R within the range X.

Figure 8:
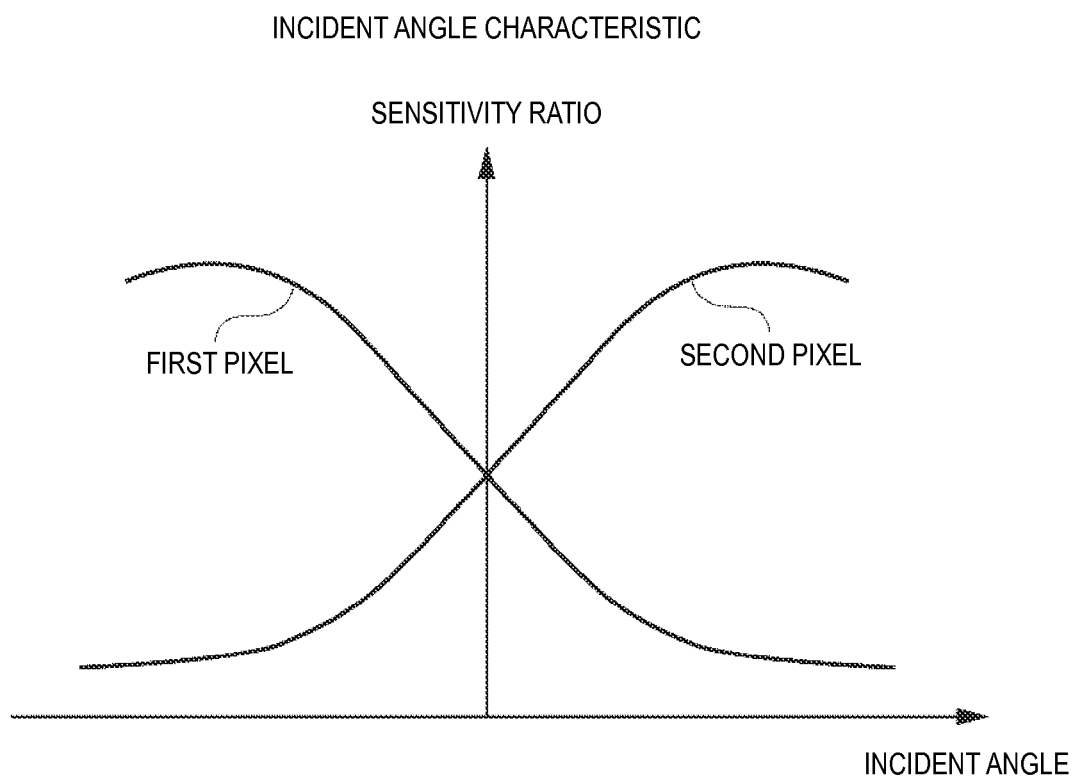
FIG. 8 is an explanatory diagram of a method for calculating a sensitivity ratio according to a second embodiment of the present invention.

FIG. 8 is an explanatory diagram of a method for calculating a sensitivity ratio according to another embodiment of the present invention. In the embodiment described in FIG. 7, the integration value is acquired, that is, respective output absolute values of the normal pixel or the first pixel and the second pixel of the phase difference pixel are accumulated within the range X to acquire the sensitivity ratio, but there are some cases where the output absolute values are not acquired, but only the ratio of the output value of the normal pixel and the output value of the phase difference pixel may be acquired.

In this case, since the integration value within the range X may not be acquired, the ratio of the output values of the normal pixel and the phase difference pixel is acquired at the incident angle with which the output value may be detected, among the incident angles within the range X. When the output value may be detected and the ratio value may be detected at of a plurality of points, the average value of the ratio within the range X is acquired and the acquired value is used as the sensitivity ratio. Even by this configuration, a sensitivity ratio required for a phase difference AF may be acquired.

Figure 9:
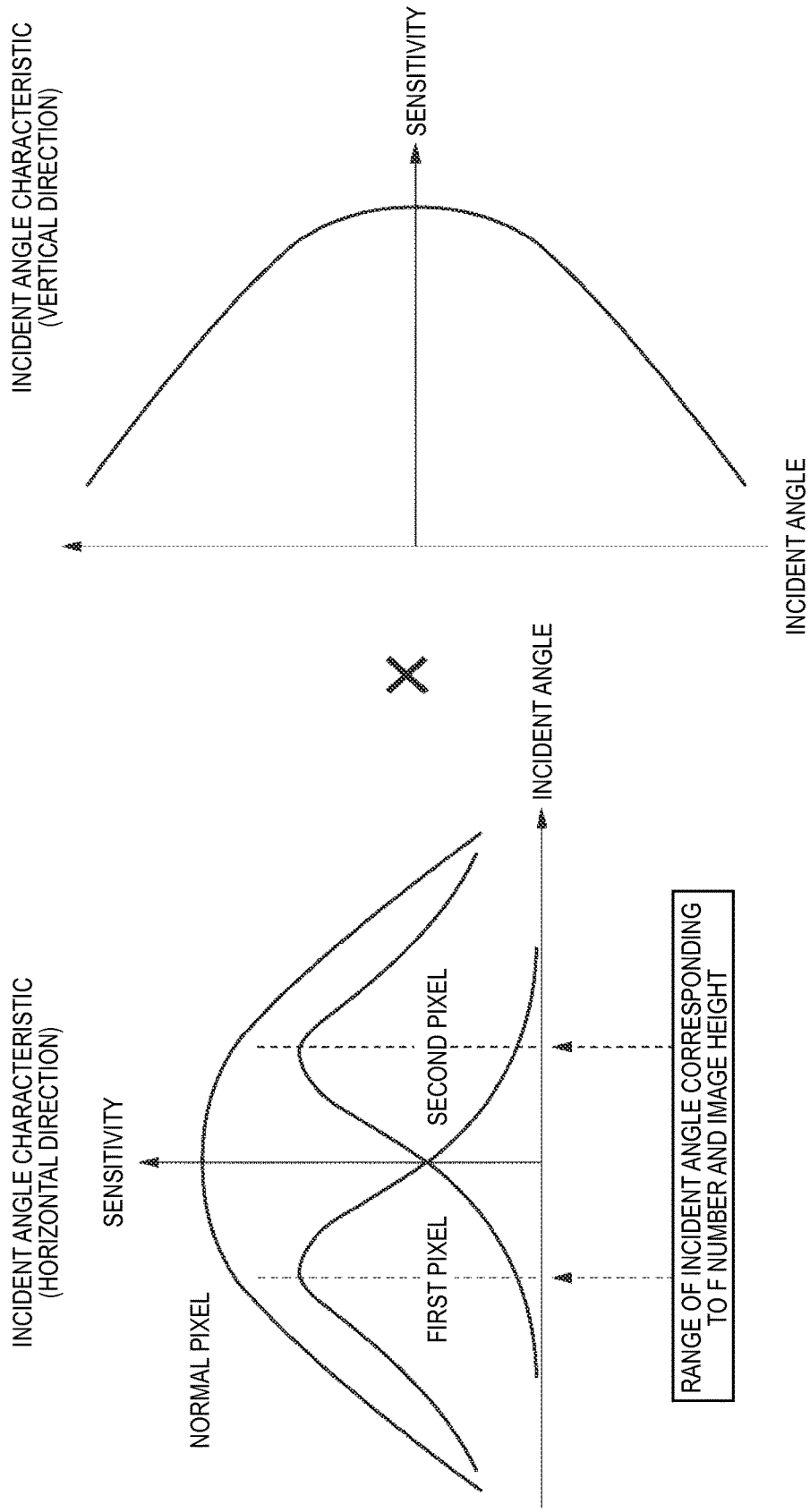
FIG. 9 is an explanatory diagram of a method for calculating a sensitivity ratio according to a third embodiment of the present invention.

FIG. 9 is an explanatory diagram of a method for calculating a sensitivity ratio according to yet another embodiment of the present invention. In the embodiments of FIGS. 6 and 8, the sensitivity ratio is calculated by considering an incident angle characteristic (characteristic representing the relationship between the incident angle and the sensitivity) in a direction (pupil division direction) in which the light blocking layer openings 2a and 2b of FIG. 3 are eccentric, that is, the horizontal direction, but in the embodiment, the sensitivity ratio is calculated by considering both the incident angle characteristic in the horizontal direction and an incident angle characteristic in a vertical direction. That is, a product of both the incident angle characteristics is calculated and the sensitivity ratio is calculated based on the calculated product similarly to the aforementioned embodiment. As a result, calculation precision of the sensitivity ratio may be improved.

However, in the embodiment, since the sensitivity ratio is calculated by using incident angle characteristics in two directions, a data amount is increased, and as a result, a time required for calculation processing is taken. Therefore, in the case where the vertical-direction incident angle characteristic may be regarded as "1", that is, a variation amount is a threshold value or less, which is not just changed or in the case where the incident angle range of the incident light is a threshold value or less, which is narrow, improvement of precision may not be so expected even in consideration of the vertical-direction incident angle characteristic, and as a result, a processing time preferably intends to be shortened without considering the vertical-direction incident angle characteristic.

Figure 10:
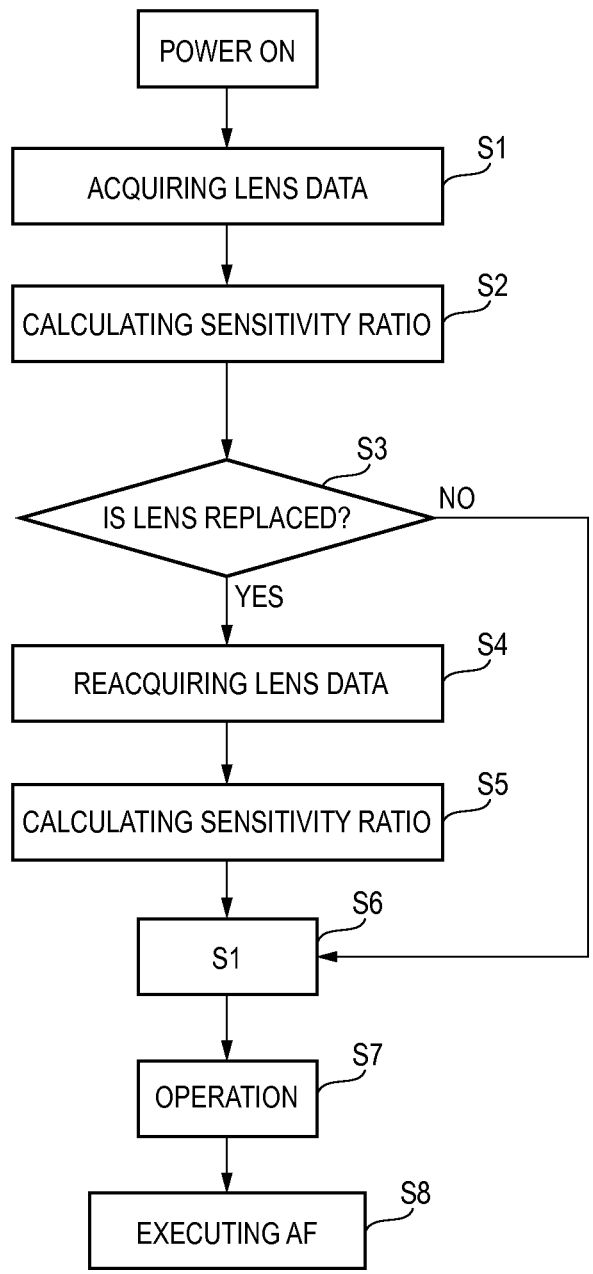
FIG. 10 is a flowchart illustrating an imaging processing sequence executed by the image capturing apparatus of FIG. 1.

FIG. 10 is a flowchart illustrating a sequence of imaging processing which the CPU 29 of the image capturing apparatus illustrated in FIG. 1 executes through the driving unit 24 or the digital signal processing unit 26 thereunder. When a power supply of the camera is turned on, the CPU 29 acquires lens data (step S1). That is, data of the F number, which is set in the photographing lens (the diaphragm of the photographing optical system), is acquired. In subsequent step S2, a captures image signal, which is output from the solid-state image capturing element 22a in a moving picture state and processed by the digital signal processing unit 26, is analyzed and the sensitivity ratio is calculated.

In subsequent step S3, it is determined whether the lens replacement is performed (alternatively, whether the F number is changed by adjusting the diaphragm 2 1b of the photographing optical system), and when the lens replacement (alternatively, the change of the F number) is not performed, the process skips to step S6 to wait for pressing (half-pressing) of a two-stage shutter button S1.

In step S3, when it is determined that the lens replacement (alternatively, the change of the F number) is performed, the process proceeds to step S4 to acquire data of the F number set in the photographing lens after the lens replacement (alternatively, the change of the F number). In addition, in subsequent step S5, the sensitivity ratio is calculated and the process proceeds to step S6.

When it is detected that the shutter button is half-pressed in step S6, the process proceeds to step S7 to correct an output difference between a pair of phase difference pixels, which deviates from each other in sensitivity, with the sensitivity ratios acquired in steps S2 and S5 and acquire the phase difference amount, and calculate how long a focus lens is moved to take the focus based on the phase difference amount. In addition, in subsequent step S8, a focusing operation is executed. Hereinafter, known photographing processing is performed while waiting for S2 pressing (full pressing) of the 2-stage shutter button and a description thereof will be omitted.

Figure 11:
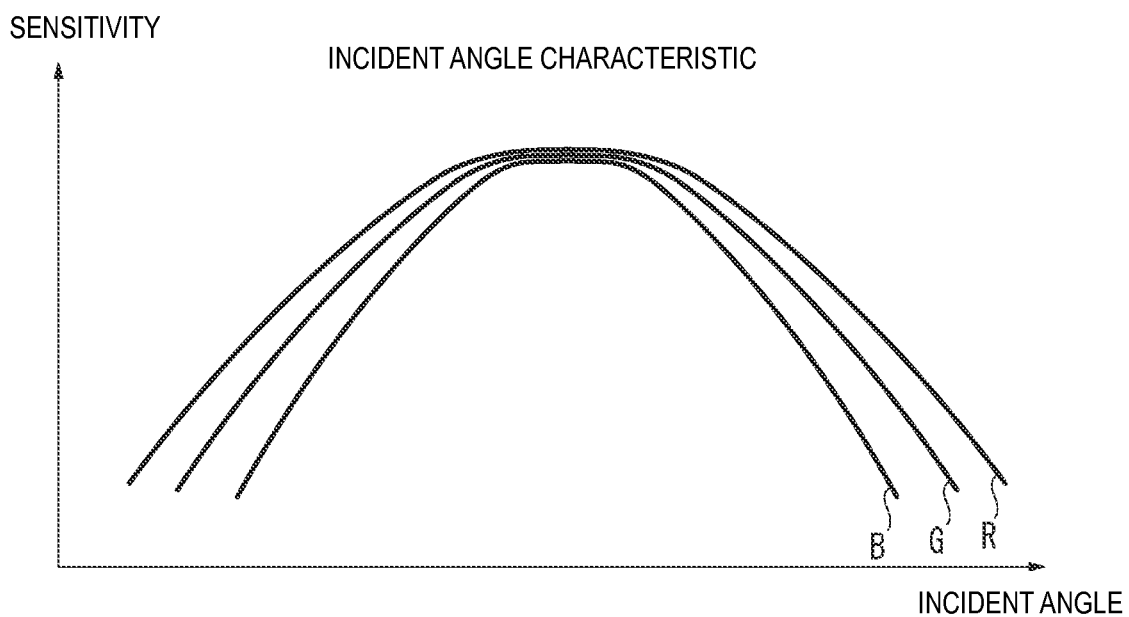
FIG. 11 is a graph illustrating that an incident angle characteristic is changed by a difference of colors R, G, and B of incident light.

In the case of the solid-state image capturing element 22a illustrated in FIG. 3, the pair of pixels of the G pixel and the g pixel are set as the phase difference pixel pair, but a pair of the R pixel and the r pixel and a pair of the B pixel and the b pixel may be set as the phase difference pixel. In this case, since wavelengths of R light, G light, and B light are different from each other, it needs to be considered that the incident angle characteristic is changed. The incident angle characteristics of the R light, the G light, and the B light in the normal pixel are illustrated in FIG. 11, but similarly even in the phase difference pixel, the incident angle depends on the wavelength. The incident angle range X corresponding to the same F number is not changed in R, G, and B, but the integration value of the sensitivity within the range is changed in the R, G, and B, and as a result, a sensitivity ratio is changed. A phase difference needs to be calculated by considering the incident angle range, the integration value of the sensitivity, and the sensitivity ratio. That is, the sensitivity ratio for each color light is calculated from the distribution of the light receiving sensitivity for each of red light, green light, and blue light, and the detection signal of the phase difference pixel is corrected for each color light. As a result, an accurate phase difference amount may be acquired.

Figure 12:
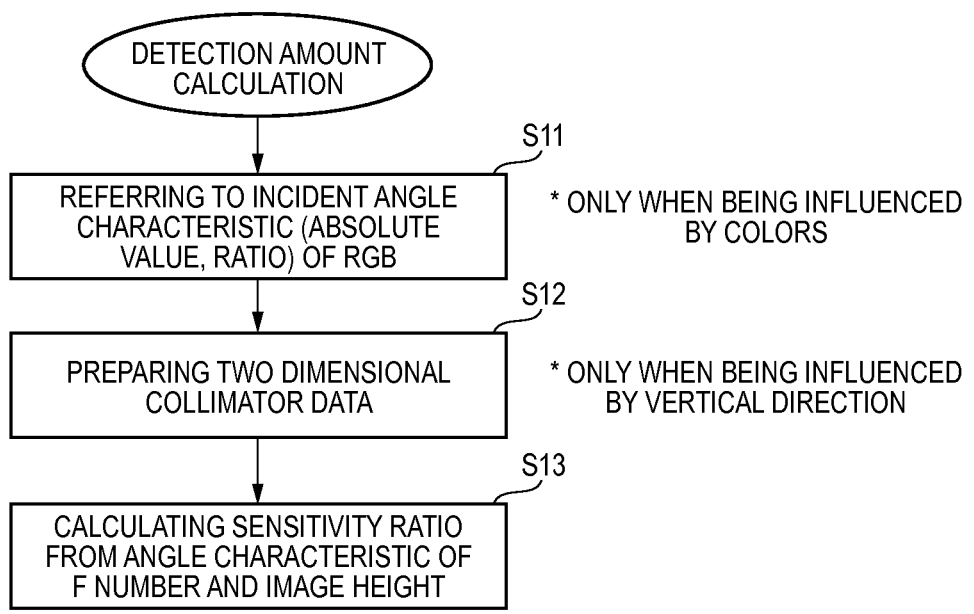
FIG. 12 is a flowchart illustrating a detailed processing sequence of a sensitivity ratio calculation processing step of FIG. 10.

FIG. 12 is a flowchart illustrating a detailed processing sequence of step S2 or step S5 of FIG. 10. When a processing step of calculating the sensitivity ratio is performed, first, an incident angle characteristic of RGB is referred to in step S11 (only when the phase difference pixel is provided even in the R pixel and the B pixel). In addition, in subsequent step S12, two-dimensional collimator data is prepared by considering both the horizontal-direction incident angle characteristic and the vertical-direction incident angle characteristic (only when being influenced by the vertical-direction incident angle characteristic), as described in FIG. 9, and in subsequent step S13, the sensitivity ratio is calculated.

As discussed above, the present description discloses the following matters. An image capturing apparatus and a method for calculating a sensitivity ratio of a phase difference pixel of the embodiments are characterized by the image capturing apparatus comprising: an image capturing element in which a plurality of pixels is formed and arranged in a two-dimensional array pattern and phase difference pixels are formed in a focus detection region within an effective pixel region; a photographing lens which is installed in a stage preceding the image capturing element; and a control unit which analyzes a captured image signal by the image capturing element, obtains a phase difference amount from detection signals of two of the phase difference pixels that make a pair, and performs a focusing control of the photographing lens, in which the control unit calculates, as a sensitivity ratio, a ratio of an integration value of light receiving sensitivity of the phase difference pixel within a range of an incident angle of the photographing lens, and an integration value of light receiving sensitivity within the range of a pixel other than the phase difference pixel, and corrects a deviation in light receiving sensitivity between the two phase difference pixels that make the pair with the sensitivity ratio to correct the detection signals for acquiring the phase difference amount.

And, the image capturing apparatus of the embodiments is characterized in that, when a ratio of a value of the light receiving sensitivity of the pixel other than the phase difference pixel and a value of the light receiving sensitivity of the phase difference pixel, detected at a predetermined angle within the range of the incident angle because the integration values are incapable of being calculated is acquired at a plurality of points, an average value of the ratio is used as the sensitivity ratio.

And, the image capturing apparatus of the embodiments is characterized in that, a characteristic representing a relationship between an incident angle in a pupil-division direction of the two phase difference pixels that make the pair and light receiving sensitivity and a characteristic representing a relationship between an incident angle in a direction, which is at a right angle to the pupil-division direction, and light receiving sensitivity are multiplied by each other to acquire the sensitivity ratio.

And, the image capturing apparatus of the embodiments is characterized in that, when a change of the characteristic, which represents the relationship between the incident angle in the direction, which is at the right angle to the pupil-division direction, and the light receiving sensitivity, is equal to or less than a threshold value and when the range of the incident angle of the incident light is smaller than a threshold value, the multiplication is skipped to calculate the sensitivity ratio.

And, the image capturing apparatus of the embodiments is characterized in that, wherein the sensitivity ratio for each color light is calculated from a distribution of light receiving sensitivity for each of red light, green light, and blue light.

And, the image capturing apparatus of the embodiments is characterized in that, the photographing lens is a lens-replaceable photographing lens, and the sensitivity ratio is acquired after replacing the photographing lens.

And, the image capturing apparatus of the embodiments is characterized in that, the range of the incident angle is a range of an incident angle corresponding to an F number and an image height of the photographing lens.

According to the aforementioned embodiments, although the sensitivity deviation occurs between a pair of phase difference pixels that detect the phase difference, it is possible to perform high-precision phase difference AF processing by appropriately correcting the sensitivity deviation.

INDUSTRIAL APPLICABILITY

The image capturing apparatus and the method for calculating a sensitivity ratio according to the present invention are usefully applied to a digital camera and the like because the focusing operation on the photographic subject of the photographing lens can be accurately performed even when the sensitivity deviation occurs between a pair of phase difference pixels because a photographic subject image which is in focus can be captured.

Although the present invention has been described in detail with reference to a specific embodiment, it is apparent to those skilled in the art that various changes or modifications can be made without departing from the spirit and the scope of the present invention.

This application is based on Japanese Patent Application No. 2011-218533 filed on Sep. 30, 2011, the entire contents of which are incorporated herein by reference.

REFERENCE SIGNS LIST

2: Phase difference detection pixel pair (first pixel and second pixel)
2a, 2b: Light blocking layer opening which is eccentric
10: Image capturing apparatus (digital camera)
21: Photographing optical system
21a: Photographing lens
21b: Diaphragm
22a: Solid-state image capturing element
24: Driving unit
26: Digital signal processing unit
29: System control unit (CPU)
I: Light receiving sensitivity distribution characteristic of normal pixel
L: Light receiving sensitivity distribution characteristic of first pixel
R: Light receiving sensitivity distribution characteristic of second pixel

The invention claimed is:

1. An image capturing apparatus, comprising:
an image capturing element in which a plurality of pixels are formed and arranged in a two-dimensional array pattern and phase difference pixels are formed in a focus detection region within an effective pixel region;
a photographing lens which is installed in a stage preceding the image capturing element; and
a control unit configured to
analyze an image signal captured by the image capturing element,
obtain a phase difference amount from detection signals of two of the phase difference pixels that make a pair,
performs focusing control of the photographing lens,
acquire a first integration value, within a range of an incident angle of the photographing lens, of light receiving sensitivity of a phase difference pixel;
acquire a second integration value, within the range of the incident angle, of light receiving sensitivity of a pixel other than the phase difference pixel;
calculate, as a sensitivity ratio, a ratio between the first integration value and the second integration value; and
corrects a deviation in light receiving sensitivity between the two phase difference pixels that make the pair with the sensitivity ratio to correct the detection signals for acquiring the phase difference amount.

2. The image capturing apparatus of claim 1, wherein, if the first and second integration values are incapable of being calculated, the control unit is further configured to
acquire, at a plurality of points, a ratio of a value of the light receiving sensitivity of the pixel other than the phase difference pixel and a value of the light receiving sensitivity of the phase difference pixel, detected at a predetermined angle within the range of the incident angle; and
calculate, as the sensitivity ratio, an average value of the ratio.

3. The image capturing apparatus of claim 1, wherein the control unit is further configured to calculate a sensitivity ratio by multiplying by each other a characteristic representing a relationship between an incident angle in a pupil-division direction of the two phase difference pixels that make the pair and light receiving sensitivity and a characteristic representing a relationship between an incident angle in a direction, which is at a right angle to the pupil-division direction, and light receiving sensitivity.

4. The image capturing apparatus of claim 3, wherein when a change of the characteristic, which represents the relationship between the incident angle in the direction, which is at the right angle to the pupil-division direction, and the light receiving sensitivity, is equal to or less than a threshold value and when the range of the incident angle of the incident light is smaller than a threshold value, the multiplication is skipped to calculate the sensitivity ratio.

5. The image capturing apparatus of claim 1, wherein a sensitivity ratio for each color light is calculated from a distribution of light receiving sensitivity for each of red light, green light, and blue light.

6. The image capturing apparatus of claim 1, wherein the photographing lens is a lens-replaceable photographing lens, and the sensitivity ratio is acquired after replacing the photographing lens.

7. The image capturing apparatus of claim 1, wherein the range of the incident angle is a range of an incident angle corresponding to an F number and an image height of the photographing lens.

8. A method for calculating a sensitivity ratio of a phase difference pixel by an image capturing apparatus which includes:
an image capturing element in which a plurality of pixels is formed and arranged in a two-dimensional array pattern and phase difference pixels are formed in a focus detection region within an effective pixel region;

a photographing lens which is installed in a stage preceding the image capturing element; and a control unit, the method comprising analyzing an image signal captured by the image capturing element;

obtaining a phase difference amount from detection signals of two of the phase difference pixels that make a pair;

performing a focusing control of the photographing lens, acquiring a first integration value, within a range of an incident angle of the photographing lens, of light receiving sensitivity of a phase difference pixel;

acquiring a second integration value, within the range of the incident angle, of light receiving sensitivity of a pixel other than the phase difference pixel;

calculating, as a sensitivity ratio, a ratio between the first integration value and the second integration value; and correcting a deviation in light receiving sensitivity between the two phase difference pixels that make the pair with the sensitivity ratio to correct the detection signals for acquiring the phase difference amount.

* * * * *